Figure 3:
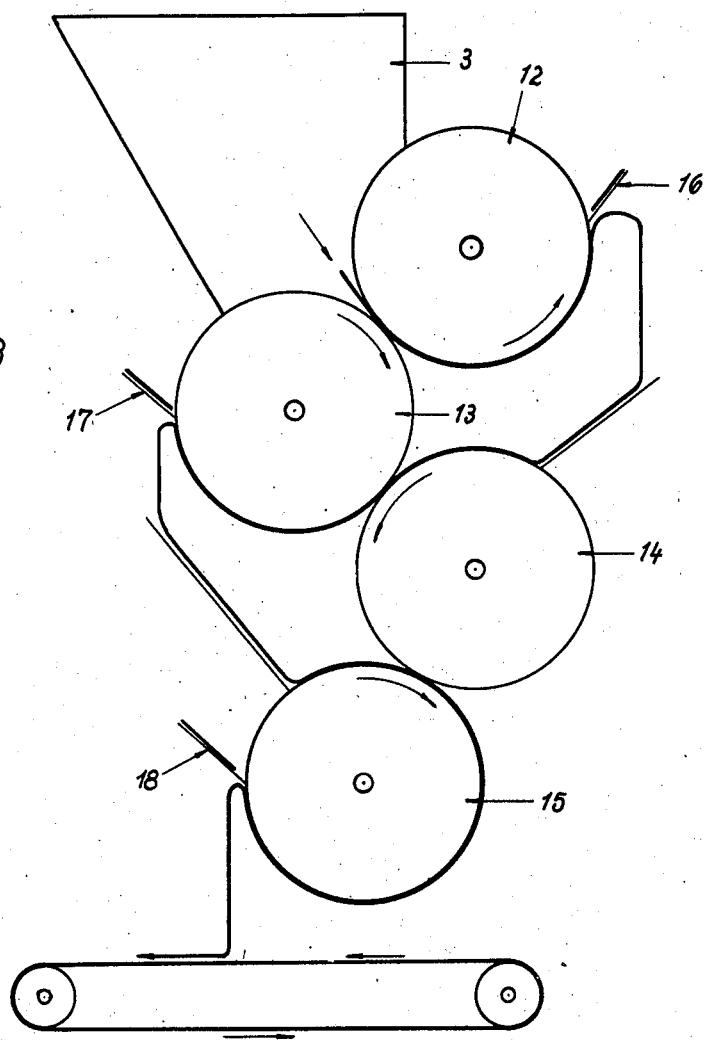

Aug. 17, 1943.   V. CONRAD   2,326,927
METHOD OF IMPROVING THE GRINDING, MIXING, AND REFINING
OF RUBBER MATERIALS, SYNTHETICS, AND PLASTICS
Filed Dec. 13, 1939   2 Sheets-Sheet 1
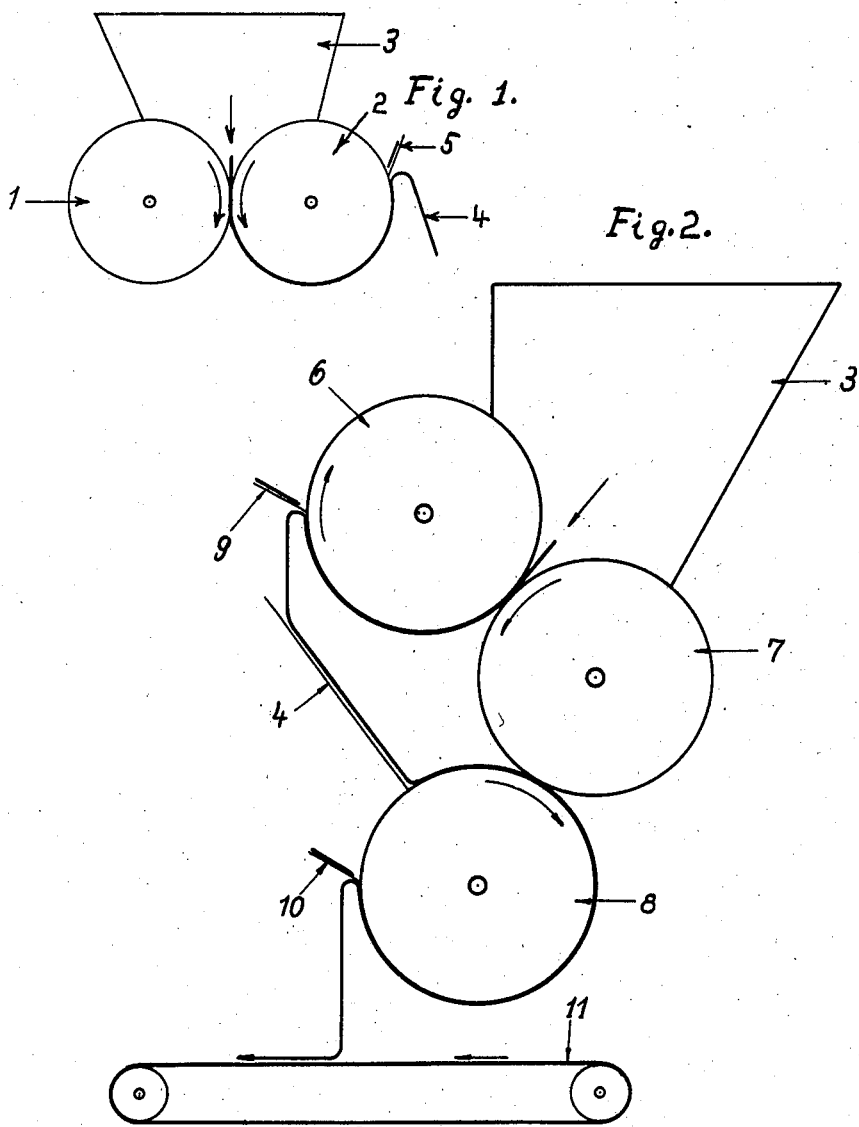
Inventor
Victor Conrad
BY Inventor
Victor Conrad Patented Aug. 17, 1943

2,326,927

UNITED STATES PATENT OFFICE 2,326,927

METHOD OF IMPROVING THE GRINDING, MIXING, AND REFINING OF RUBBER MATERIALS, SYNTHETICS, AND PLASTICS

Victor Conrad, Berlin-Wilmersdorf, Germany; vested in the Alien Property Custodian Application December 13, 1939, Serial No. 309,102 In Germany January 15, 1938

3 Claims. (Cl. 18—48)

This invention relates to a method of improving the grinding, mixing and refining of rubber materials, synthetics and plastics of every description.

For fine grinding, mixing and refining plastics of all sorts, particularly rubber material like natural or synthetic caoutchouc or mixtures thereof with additions, rubber waste, regenerated and plastic rubber masses, etc., synthetics of all kinds, as soft or hard rubber-like polymerization or mixed polymerization products, for instance from acetylene, ethylene, budadiene and its derivatives, vinyl or acryl and their derivatives, etc., artificial substances made from cellulose and its derivatives, casein etc., artificial resin masses of condensation products, as phenoplasts and aminoplasts, especially hardenable quick pressing masses, it has been customary hitherto to employ low-speed two-roller machines having rollers of larger diameter. These machines work with more or less friction, depending on the purpose for which they serve, and could therefore be used both as mixers and refiners. They were always designed to operate at low speed which, particularly when rubber materials and allied products had to be handled, was considered indispensable in order to prevent damage to the material, especially by excessive heating. Attempts have been made to obtain a particular effect by increasing friction, but efforts along these lines had to be given up, since the material was subjected thereby to too much stress.

It has now been found that, contrary to the prevailing opinion, the above-mentioned products may be advantageously worked at much higher circumferential speeds than at present.

It has further been found that greater efficiency is obtainable not only by increasing circumferential speed but also by keeping the working faces on which the material is treated as small as possible, which can be done by reducing the diameter of the rollers below the usual size.

The method according to the invention may be applied to two-roller machines, though still better results may be had by applying it to machines having three or more rollers, in which the material or film can be more carefully handled by being rearranged and passed to the next pair of rollers. The fundamental advantages afforded by the method according to the invention consist in a much higher output compared with that of the old low-speed machines and in the possibility of attaining better degrees of fineness and plasticization in refiners within a shorter time. Although high-speed machines according to the invention produce due to a much more efficient grinding of the material a much higher working temperature which in low-speed machines would damage the material, the latter is protected against this danger by being rapidly removed from the relatively small frictional area, so that, due to the thermo-plasticization, which is of short duration and therefore spares the material, greater efficiency is attained.

Furthermore, by increasing the circumferential speed of the rollers at given friction relations a machine may be particularly adapted to the decomposition of plastic masses, as synthetic rubber or other artificial masses, in which case, in contradistinction to existing methods, special heating of the rollers may be dispensed with or applied only to a certain extent, since owing to the increased circumferential speed of the rollers considerable temperatures develop in the gaps at normal refining friction. Under certain circumstances cooling may be necessary for regulating the temperature. Therefore means for heating and cooling may be provided in order to obtain and maintain a predetermined temperature. Such heating and cooling is known, but in the method according to the invention this measure is of special importance for regulating the temperature and especially with regard to the effect of decomposing artificial substances or in handling with artificial resin masses or the like.

For instance the method of decomposing synthetic rubber by means of high-speed rollers according to the invention may, moreover, be combined with the thermal decomposition of the products mentioned or of similar products in autoclaves, etc., in such a manner that decomposition is begun in autoclaves or in vessels with revolving or circulating air or steam or in any other way and completed on high-speed mills, or vice versa, the combination of these two methods forming one of the objects of the invention.

The method according to the invention involves also an essential improvement as to quality with respect to the distribution of gas soot or other filling materials in natural or synthetic rubber.

The much more effective grinding of the material in combination with the higher roller temperatures developing according to the invention produce increased plasticization, and improved forming of the film, so that rubber and similar materials can be regenerated at lower temperatures and in a shorter time than heretofore and the usual amount of plasticizers and softening agents may partly be reduced to a considerable extent with the result that the physical properties of the products are much improved, as it is well known that a liberal addition of such substances tends to impair them. The method according to the invention insures the attainment of a considerably reduced film thickness even if plasticizers or softeners are omitted or added only sparingly, and thereby a corresponding improvement in grinding, fine grinding and refining.

The invention as applied to a roller arrangement is diagrammatically illustrated, by way of example, in the accompanying drawings, in which Figure 1 shows a mill comprising two rollers;

Figure 2 is a view of a three-roller construction; and

Figure 3, a view of a four-roller arrangement.

In the construction shown in Fig. 1 two rollers 1, 2 are disposed side by side horizontally. The material to be worked is fed through hopper 3. The taking-off roller 2 rotates at a circumferential speed exceeding 50 m. per minute, and the film 4 formed thereon is removed by a stripper 5.

In the arrangement shown in Fig. 2 three rollers 6, 7, and 8 are superposed in staggered relation and supplied with material from the hopper 3.

Low-speed machines of this type are known, though low-speed three-roller mills have never been used in the industry concerned.

According to the invention, machines of this class are improved by choosing a circumferential speed considerably in excess of that at which they are operated at present and by reducing the diameter of the rollers.

In the construction shown in Fig. 2 it is assumed that the middle roller 7 moves at a lower speed than the rollers 6 and 8 of which at least the lowermost roller 8 has a minimum circumferential speed of 50 m. per minute. The figure indicates how the film 4 may be rearranged by being taken off by a stripper or other suitable means from the top roller 6, turned and passed to the central roller 7. After it has been removed from the high-speed roller 8 by a stripper 10 the film 4 is deposited on a conveyor 11.

Owing to this rearrangement, the material is more thoroughly cooled and better preserved. Simultaneously, the quality of the product is enhanced, since even in case of scratched rollers rearrangement of the material insures the working thereof by other portions of the rollers.

The staggered arrangement of the rollers and the provision of a low-speed middle roller afford considerable advantages when pulverulent, granular, hard or not fully plastic masses are supplied which do not yet form a film. Due to the staggered arrangement of the rollers, nonplastic or incompletely plasticized particles do not drop on the floor as in horizontal roller constructions but are positively guided to the next frictional area. This is of particular importance if materials are to be treated which in the cold state are still powdery or crumbly and which become plastic only when heated, such as is the case with quick pressing or synthetic masses of all sorts.

Fig. 3 shows a machine with four rollers 12, 13, 14 and 15, in which the material is twice removed, i. e., from the roller 12 by the stripper 16 and from the roller 13 by the stripper 17, turned and finally stripped off from the last roller 15 by a member 18 and passed to the conveyor 11, at least one of the rollers, in this instance the roller 15, having a minimum circumferential speed of 50 m. per minute.

With respect to numerous products it has been found advisable to employ circumferential speeds up to 100 to 180 m. per minute to insure proper working. Certain products will stand even higher speeds, though the advantage afforded by the method according to the invention, which consists in progressively improving both output and fineness by a corresponding increase of the circumferential speeds of the rollers, particularly of the roller or rollers running at highest speed, is obtainable already at a circumferential speed of 50 m. per minute.

When high-speed machines having for instance three rollers are used according to the invention, they may be rendered particularly efficient by reducing the friction of the first frictional area, so that in case of poor mixtures the first frictional area acts as mixer whilst the second frictional area, by a corresponding increase in friction, assumes the function of a refiner. It is further possible to provide for a frictionless area which has a calender-like action.

Although the two last-mentioned features are known per se, they are nevertheless novel and important in connection with the increased circumferential speeds of the rollers according to the invention.

As to the ratio of the diameter to the length of the rollers extensive experiments have shown that body lengths of 600 mm. to 700 mm. with a diameter below 500 mm. give excellent results. In this case, the circumferential speed of the roller moving at highest speed is preferably 100 to 180 m. per minute. If for any reasons the body length has to be increased to, say, 850 mm., the diameter of the roller should be enlarged accordingly, for instance up to 650 mm. The circumferential speed of the fastest roller would then amount also to 100 to 180 m./min.

In the last-mentioned instances when the rollers have a diameter of 650 mm. and a length of 850 mm. the frictional path is of course equal to the one found in low-speed machines having similar dimensions, but the time consumed in friction is much shorter due to the increased circumferential speed, so that the material is subjected to high temperature for a shorter period and is, moreover, extensively protected by its subsequent rearrangement. It has been found that the increase in circumferential speed according to the invention involves fundamental advantages compared with low-speed machines even in case of larger roller diameters.

Generally, however, rollers having body lengths that are not too large and smaller diameters are preferable for the reason that shorter body lengths show less deflection and smaller diameters shorten the frictional path, apart from the fact that at equal application pressure a roller having a small diameter exerts a higher specific pressure upon the material.

It may finally be mentioned that for the production of a particularly thin rubber film the known eccentric adjustment of the rollers is preferable to the sliding bearing construction and should therefore be used for the high-speed roller mills according to the invention together with high gearing of the adjusting rods.

I claim:

1. The method of improving the grinding, mixing and refining of plastics and similar rubber-like material which consists in working these substances on mills in which the rollers have diameters not exceeding one-half meter and in which the fastest rotating roller or rollers have a relatively high circumferential speed between one hundred and one hundred eighty meters per minute.

2. The method of improving the grinding, mixing and refining of plastics and similar rubber-like material which consists in working these substances on mills having at least three rollers with a first frictional area between the first and second rollers and a second frictional area between the second and third rollers, said rollers operating at a relatively high circumferential speed between eighty and one hundred eighty meters per minute and having diameters not exceeding one half meter, and the friction of said first frictional area being preferably less than that of the second said area and wherein the friction of said first area is reduced to such an extent that the machine at this point acts as a mixer while the friction of the second said area is such that the machine at this point acts as a refiner.

3. The method of increasing the refining of rubber material in which roller mills provided with two rollers operating at different speeds, the faster roller having a speed of more than 100 m. per minute and each roller having a diameter below 500 mm.

VICTOR CONRAD.